April 23, 1935.   M. B. BENSON   1,998,891
REDUCTION GEAR MECHANISM
Filed May 26, 1933   2 Sheets-Sheet 1
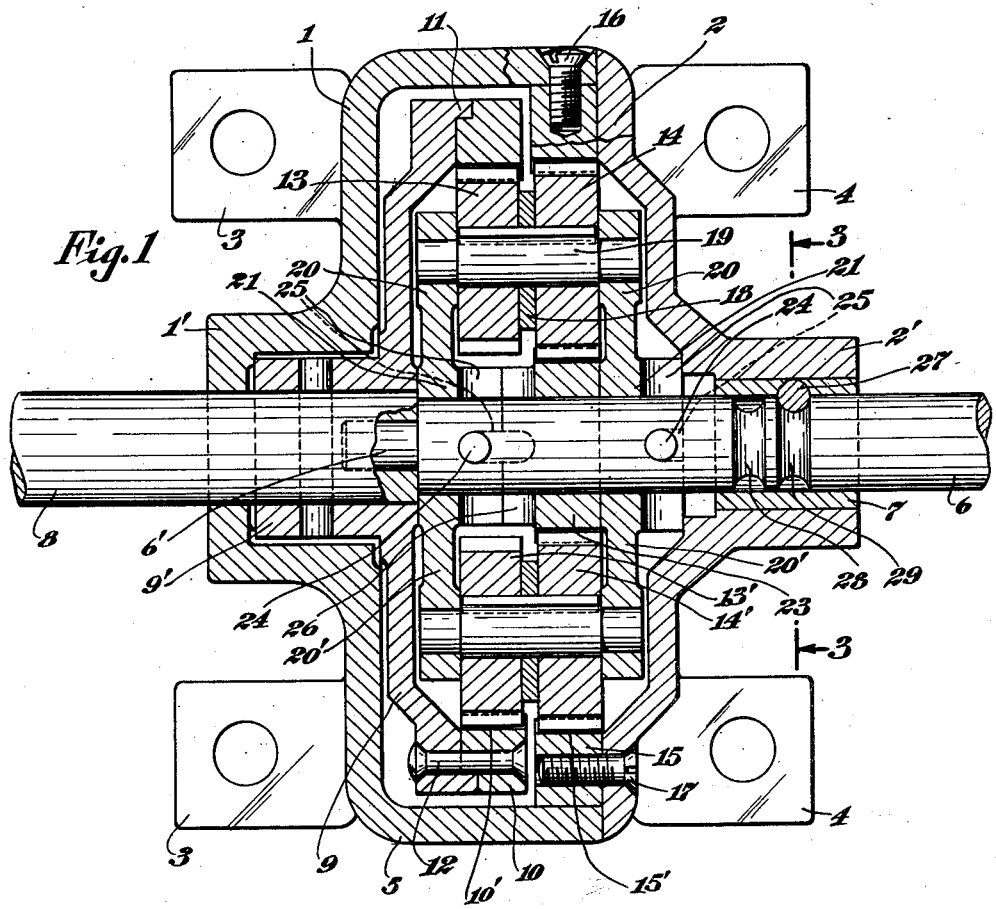
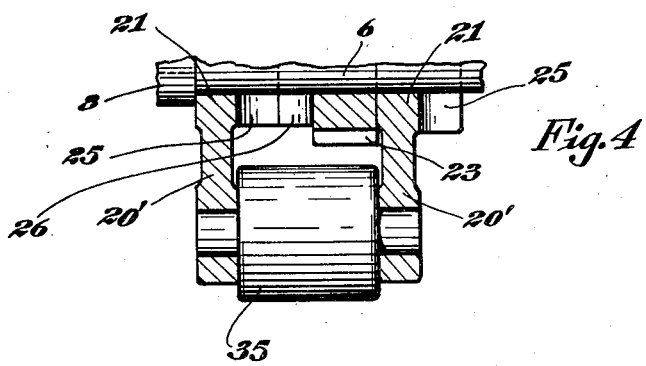
INVENTOR
Melvin B. Benson,
BY *Bartlett Eyre Scott Keel*
ATTORNEYS April 23, 1935.  M. B. BENSON  1,998,891
REDUCTION GEAR MECHANISM
Filed May 26, 1933   2 Sheets-Sheet 2

INVENTOR
Melvin B. Benson,
BY Bartlett Eyre Scott Keel
ATTORNEYS

Patented Apr. 23, 1935

1,998,891

UNITED STATES PATENT OFFICE 1,998,891

REDUCTION GEAR MECHANISM

Melvin B. Benson, New York, N. Y.

Application May 26, 1933, Serial No. 672,911

14 Claims. (Cl. 74—289)

This invention relates to a reduction gear mechanism for power transmission and particularly to a mechanism enabling the operator to selectively obtain one or more ratios of speed reduction at will, although certain features of the invention are applicable to a one ratio reduction.

One object of the invention is a novel epicyclic and differential reduction gear system. A further object of the invention is a novel and improved gear reduction mechanism or unit capable of operation at one or more different speed ratios at the will of the operator.

A further object is a mechanism of this character which is capable of being shifted from one to the other of the speed ratios by a simple shift of one of the drive shafts. A further object of the invention is a novel and improved combined epicyclic and differential gear unit which is characterized by the compactness of the unit and by the simplicity of its mechanism. A further object of the invention is a gear reduction unit of the above indicated character which is particularly adapted to applications involving small torque, although certain features of the mechanism are applicable to power transmissions generally. Further objects of the invention will hereinafter appear.

For a better understanding of the invention reference may be had to the accompanying drawings wherein:

Fig. 1 is a sectional view through a unit embodying the invention;

Fig. 4 is a view illustrating a modification.

Figure 2:
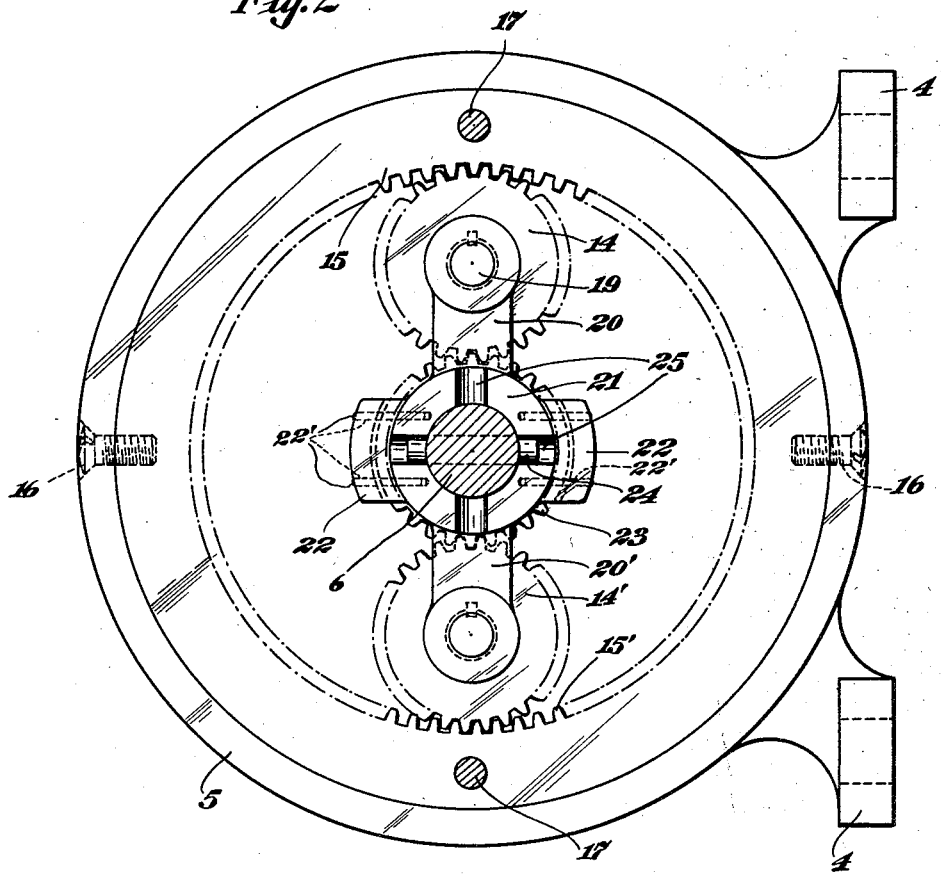
Fig. 2 is an end view partly in section of the unit.
Figure 3:
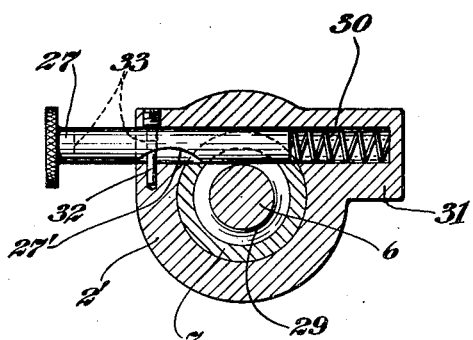
Fig. 3 is a section along the line 3—3 of Fig. 1.

Referring to the drawings where like numerals designate similar parts, I have illustrated my invention as embodied in a unit comprising a casing having mating parts 1 and 2, the part 1 being provided with attachment feet 3 and 4. The two parts may be fastened together in any suitable manner and form a cylindrical part 5 which in the particular embodiment shown is an integral part of the mating member 1. A drive or input shaft 6 is journalled in the hub 2' of the casing member 2, a bearing sleeve 7 being disposed around the shaft 6 and within the hub 2'. The free end 6' of the drive shaft is reduced in diameter and is journalled in a cylindrical recess formed in the inner end of the driven shaft 8. The latter is journalled in the hub 1' of the left hand casing member 1. The shaft 8 carries a disc 9, and the latter has a hub part 9' which is keyed to the driven shaft 8 and projects into the hub 1'. The disc 9 carries an annular gear ring 10 having formed thereon internal teeth 10' and this ring may be formed integrally with the disc 9 or separately therefrom as desired. In the particular embodiment shown this ring is made separate from the disc 9 and is formed with a shoulder engaging the annular flange 11 formed on the disc 9 and the two parts are rigidly and firmly fastened together by bolts or rivets 12.

The internal gear or ring gear 10 is driven by an epicyclic gear unit comprising the gears 13 and 14, the former being of slightly smaller diameter than the gear 14 and meshing with the teeth 10' of the gear ring 10, while the gear 14 meshes with a stationary annular gear 15 which is carried by and fastened to the casing 1, 2 in any suitable manner, as for example by the bolts 16 and 17. The gears 13 and 14 are spaced by a spacing plate 18 and are fastened together as a unit to rotate together in unison. For this purpose they are keyed to a common shaft 19 which is journalled in a pair of radially disposed arms or frame members 20, the latter being driven or rotated about the axis of the input shaft 6. The frame members 20 are carried by and project out from hubs 21 which surround and are journalled upon the shaft 6. The frame 20 and the hub structures 21 are reinforced by the reinforcing members 22 and in the particular embodiment of Fig. 1 the arms 20 are duplicated on the opposite side of the shaft 6 as arms 20', these duplicate arms or frame members carrying duplicate gears 13' and 14' for meshing with the gear ring 10 and the gear ring 15 respectively. A double drive is thereby provided between the epicyclic carrying members 20, 21 and the gear ring 10.

The shaft 6 may be either coupled directly to the epicyclic frame 20 (20') or may be geared thereto through an intermediate pinion 23. In Fig. 1 the shaft 6 is illustrated as directly coupled to the epicyclic frame. For this purpose the shaft 6 is provided with radially disposed pins 24, which pins project into slots 25 formed in the hubs 21 of the epicyclic frame. Disengagement may be effected by shifting the shaft 6 longitudinally of its length, to the right in Fig. 1, the pins 24 being thereby carried by the shaft beyond the hubs 21, whereupon the epicyclic frame 20 is then simply journalled upon the shaft 6 for relative rotation thereon.

The gear 23 meshes with the gear 14 (and 14')

and while the shaft 6 is coupled to the epicyclic frame 20 the gear 23 is simply freely journalled upon the shaft 6. This gear 23, however, is provided with coupling slots 26 on one side adjacent the hub slots 25 of the left hand frame member 20 (Fig. 1) and by shifting the shaft 6 to the right the pins 24 are caused to enter these slots 26 of the gear 23 thereby coupling the gear 23 to the shaft 6, while the epicyclic frame 20, 20' is free to revolve relatively to the shaft.

For holding the shaft 6 in either of its two alternative positions, I have shown a locking pin 27 which is disposed in a cylindrical recess formed in the hub 2' and disposed tangentially with respect to the shaft 6. This pin 27 enters either of the two grooves 28 and 29 formed on the periphery of the shaft 6, these grooves being spaced the distance required to move the shaft 6 longitudinally of its length to shift from coupling position with the frame 20 to coupling position with the pinion 23 or vice versa. The pin 27 is normally urged to a position for locking the shaft 6 by a spring 30 which is disposed in the recess down beneath pin 27. The recess continues down into an enlargement 31 formed in the hub 2'. A recess 27' is formed on one side of the pin 27, this recess being large enough to clear the shaft 6 and permit the latter to be shifted longitudinally when the pin 27 is moved down against the tension of the spring 30 with the recess 27' in registry with the shaft 6. In order to keep the pin 27 properly aligned I have shown a pin 32 which is disposed transversely of the pin 27 and passes through a slot 33 formed therein, the pin 32 being retained in a recess formed in the hub 2'.

In the embodiment of Fig. 4 one of the sets of gears 13, 14 and 13', 14' is dispensed with and in place thereof I have shown a counter-weight 35, this counter-weight balancing the driving pinions 13 and 14.

By the construction shown one or more distinct and different speed ratios may be obtained simply by selectively moving the shaft 6 from one longitudinal position to another. This may be simply and quickly effected by pushing down the locking pin 27 and thereby releasing the shaft, which may then be easily shifted. The mechanism is very simple and the unit is characterized by its few parts and by the economy with which the unit may be manufactured and maintained. It is also characterized by its compactness.

The speed ratio between the input shaft 6 and the output shaft 8 depends upon the relative diameters of the gear rings 10 and 15 and of the pinions 13, 14 and 23 and also, of course, upon whether the shaft 6 is coupled to the pinion 23 or to the epicyclic frame 20, 20'. With the shaft 6 coupled to the epicyclic frame 20, 20', as illustrated in Fig. 1, the speed reduction ratio is the diameter of the ring 10 multiplied by the diameter of the gear 14 divided by the product of the diameters of the ring 10 and the gear 14 minus the product of the diameters of the ring 15 and the pinion 13. The speed reduction ratio with the shaft 6 coupled to the pinion 23 is the above indicated speed ratio multiplied by a sum obtained by dividing the diameter of the ring 15 by the diameter of the pinion 23 and adding the numeral 1 thereto.

While I have shown in the preferred construction the two or multiple speed ratio, it may be advisable in certain cases, where the two or more speed ratios are not desired, to omit one of the ratios. For example, by omitting the means for coupling the shaft 6 to the epicyclic gear carrier 20, 20' and permanently coupling the pinion 23 to the shaft 6, then the overall speed ratio is obtained as described above without the other and smaller speed ratio. Again in certain cases it might be desirable to use the smaller ratio alone in which case the pinion 23 may be omitted and its coupling means together with the coupling means for releasably coupling the epicyclic carrier 20, 20', the latter being then permanently coupled to the shaft 6.

In the particular embodiment shown in the drawings the reinforcement 22 comprises a pair of U-shaped reinforcing members disposed on opposite sides of the axis of the shafts and bridging the gear element 23. These reinforcing elements 22 have their legs attached to the hubs of the frame structure 20 by means of the attaching screws 22'.

I claim:

1. A reduction gear unit comprising a stationary frame, input and output shafts journalled therein, an annular gear element carried by the output shaft, an annular gear element carried by the frame, an epicyclic frame adapted for rotation about the axis of the input shaft and carrying a set of epicyclic gear elements fixed for rotation in unison, one of said gears being in mesh with the stationary annular gear the other of said gears being of different diameter and meshing with the annular gear carried by the output shaft, a pinion surrounding said input shaft and meshing with the first of said gear elements and means for coupling said input shaft to either the epicyclic frame or the pinion at will.

2. A gear mechanism of the character set forth in claim 1 wherein the input shaft is coupled to or disengaged from the other of the elements by longitudinal shifting thereof.

3. A gear mechanism of the character set forth in claim 1 wherein the input shaft is coupled to or disengaged from the other of the elements by longitudinal shifting thereof, together with means for locking said shaft in either one of its two longitudinal positions.

4. In a gear mechanism of the character set forth in claim 1 wherein the epicyclic frame and the pinion carry juxtaposed coupling elements and the shaft is provided with a coupling element which cooperates with either of the first mentioned coupling elements depending upon the longitudinal position of the shaft.

5. In a gear mechanism of the character set forth in claim 1 wherein the epicyclic frame and the pinion carry juxtaposed coupling elements and the shaft is provided with a coupling element which cooperates with either of the first mentioned coupling elements depending upon the longitudinal position of the shaft, together with means for locking and releasing the input shaft for longitudinal movement for shifting from one coupling to another.

6. In a gear mechanism of the character set forth in claim 1 wherein the epicyclic frame and the pinion carry juxtaposed coupling elements and the shaft is provided with a coupling element which cooperates with either of the first mentioned coupling elements depending upon the longitudinal position of the shaft, together with means for locking and releasing the input shaft for longitudinal movement for shifting from one coupling position to another, said last named means comprising a locking pin cooperating with spaced grooves formed in the input shaft, said pin having a recess on one side for registry with the shaft 6.

7. In a gear mechanism of the character set forth in claim 1 wherein the epicyclic frame and the pinion carry juxtaposed coupling elements and the shaft is provided with a coupling element which cooperates with either of the first mentioned coupling elements depending upon the longitudinal position of the shaft, together with means for locking and releasing the input shaft for longitudinal movement for shifting from one coupling position to another, said last named means comprising a locking pin cooperating with spaced grooves formed in the input shaft, said pin having a recess on one side for registry with the shaft 6, and being normally biased to locking position and guided to retain the recess side adjacent the shaft.

8. A reduction speed unit comprising input and output shafts, a stationary gear, a driven gear keyed to the driven shaft, a pair of pinions adapted to rotate in unison, said pinions being of different diameters and meshing respectively with the driven gear and the stationary gear, a frame member for causing said pinions to traverse the driven and stationary gears, a third pinion meshing with one of the first named pinions and means for coupling the input shaft to either said frame or said last named pinion.

9. A reduction speed unit comprising input and output shafts, a stationary gear, a driven gear driving the driven shaft, a pinion unit meshing with the driven gear and the stationary gear, a frame member causing said pinion unit to traverse the driven and stationary gears, a second pinion meshing with one side of the pinion unit and means for coupling the input shaft to either said frame or said last named pinion.

10. A gear unit of the character set forth in claim 9 wherein the second pinion surrounds the input shaft and the means for coupling is disposed between a part of the frame member and said second pinion.

11. A gear unit of the character set forth in claim 9 wherein the coupling is operated by a longitudinal shifting of one of said shafts.

12. In a gear unit of the character set forth in claim 9 wherein the coupling is operated by a longitudinal shifting movement of one of said shafts, including means for locking said shaft in either one of its two longitudinal positions.

13. In a gear unit of the character set forth in claim 9 wherein the coupling is operated by a longitudinal shifting movement of one of said shafts, including means for locking said shaft in either one of its two longitudinal positions, said last named means comprising a locking pin cooperating with spaced grooves formed in the shaft.

14. In a gear unit of the character set forth in claim 9 wherein the coupling is operated by a longitudinal shifting movement of one of said shafts, including means for locking said shaft in either one of its two longitudinal positions, said last named means comprising a locking pin cooperating with spaced grooves formed in the shaft, said pin being normally biased to locking position.

MELVIN B. BENSON.